March 26, 1935. E. DODSON 1,995,800
THROTTLE CONTROL FOR SUPERCHARGED AIRCRAFT ENGINES
Filed July 6, 1934 3 Sheets-Sheet 1

Edward Dodson
Inventor

March 26, 1935. E. DODSON 1,995,800
THROTTLE CONTROL FOR SUPERCHARGED AIRCRAFT ENGINES
Filed July 6, 1934 3 Sheets-Sheet 2

Patented Mar. 26, 1935

1,995,800

UNITED STATES PATENT OFFICE 1,995,800

THROTTLE CONTROL FOR SUPERCHARGED AIRCRAFT ENGINES

Edward Dodson, Streatham, London, England

Application July 6, 1934, Serial No. 734,065
In Great Britain September 16, 1933

9 Claims. (Cl. 261—39)

This invention relates to throttle controls for aircraft, and refers to the use of such controls for controlling supercharged or other high compression ratio internal combustion aircraft engines (hereinafter referred to as "supercharged aircraft engines" for brevity).

In such engines a device known as a "boost control" automatically prevents the pilot from opening the throttle valve more than is safe for a given altitude, while a mixture control lever is provided to enable the mixture to be altered so as to prevent strain on the engine.

With the boost control now used it is possible to get the full boost permitted by said boost control at any altitude (hereinafter referred to as the "normal boost"), with the pilot's throttle lever only halfway between the throttle closed and the full throttle position, or even less, it is possible that he may either wilfully, or by accident, obtain normal boost with a weak mixture setting of the mixture control lever.

The object of the present invention is to prevent the pilot from obtaining normal boost with a weak mixture.

Another object is to obviate the present known lost motion between the pilot's throttle lever and the carburetter throttle lever as exists with known forms of automatic boost control devices. A further object is to assure a definite boost pressure always occurring at a given angular position of the pilot's throttle lever below the rated height of the engine if the engine is supercharged.

A further object is to make sure that the power jet is always in action at powers approaching normal boost and is out of action at lesser boost pressures for cruising. A still further object is to enable the heat applied to the carburation system to be varied in accordance with changes in boost pressure by interconnecting the pilot's throttle control lever with the heat control means.

According to this invention the boost control is set so as to prevent the induction pressure rising to an amount which is, say, greater than one lb. per square inch below the normal boost pressure when the pilot's throttle lever is in a partly closed position and the pilot's throttle lever is adapted as it approaches the full throttle position to change the datum of the boost control so as to increase the induction pressure to that of the normal boost (say plus one lb.).

This increase of induction pressure may be either progressive from very small throttle openings or may be arranged to take place more suddenly as the pilot's throttle lever is moved towards the normal boost or full throttle position. Means may be provided operable by the pilot's throttle lever for moving the mixture control to enrich the mixture as the throttle lever changes the datum of the boost control.

The change in datum of the boost control may be effected by means, such as that for adjusting the position of the aneroid capsules as a whole or by an air-leak for the pressure supplied to the aneroid device of the boost control. In this way it will be impossible for the pilot to obtain normal boost pressure until the pilot's throttle lever is either at, or near to, the full throttle position, when the mixture control may also have been moved to enrich the mixture.

The invention will now be described by way of example with reference to the construction shown in the accompanying drawings in which:—

Figures 1, 4:
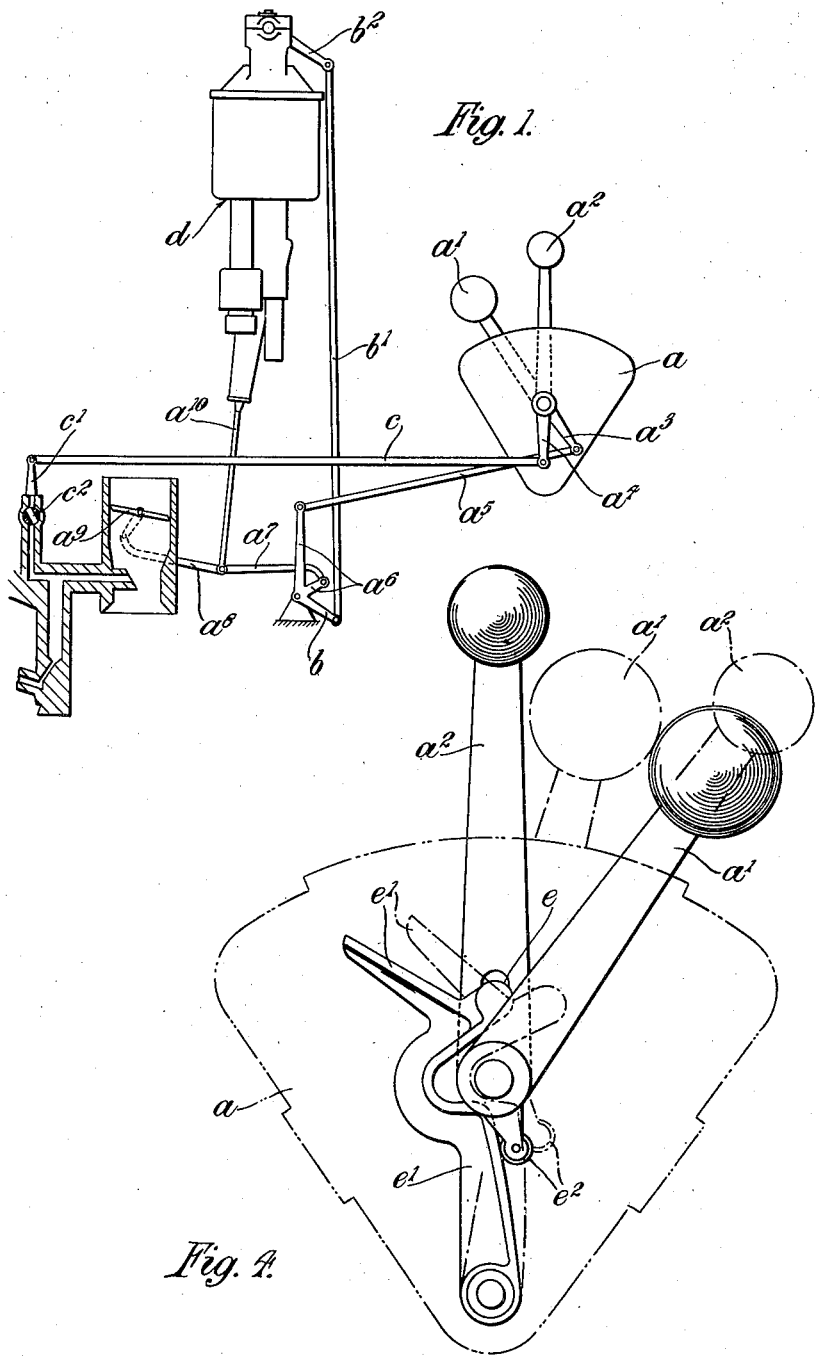
Fig. 1 is a diagram of the controls according to this invention.
Fig. 4 illustrates diagrammatically the pilot's throttle lever and the mixture control lever, and shows how the mixture control lever is actuated by the throttle control lever.

Referring to Fig. 1 of the accompanying drawings, the casing $a$ carries the pilot's throttle lever $a^1$ and the mixture control lever $a^2$ which have arms $a^3$ and $a^4$ respectively externally of said casing. The arm $a^3$ is connected in the usual way by the connection $a^5$ to the bell crank lever $a^6$ which actuates the toggle linkage mechanism $a^7$, $a^8$ through which said throttle control lever operates the carburetter throttle valve $a^9$. The toggle linkage mechanism $a^7$, $a^8$ is connected by the link $a^{10}$ to the boost control device to be hereinafter described. The bell crank lever $a^6$ is provided with an arm $b$ which operates, through a link $b^1$, the arm $b^2$ of mechanism for changing the datum of the boost control, to be hereinafter described.

The arm $a^4$, operated by the mixture control lever $a^2$, is connected, for instance, by the link $c$ to the operating arm $c^1$ of the mixture control valve $c^2$ controlling the admission of supplementary air to the carburetter. The valve $c^2$ varies the proportion by weight of fuel to air so that, when the mixture control lever $a^2$ is moved from the central position shown in Fig. 1 to the left, the valve $c^2$ is closed and the mixture is enriched, while when the lever $a^2$ is moved from said central position to the right in Fig. 1, the opening of the valve $c^2$ is increased and the mixture is weakened. In the connection between the mixture control lever $a^2$ and the mixture control valve $c^2$ an automatic mixture control of known form is preferably provided to correct the mixture for changes in altitude, this control having means for overriding the automatic mixture control so as to cause a rich mixture to be supplied at any altitude.

Figure 2:
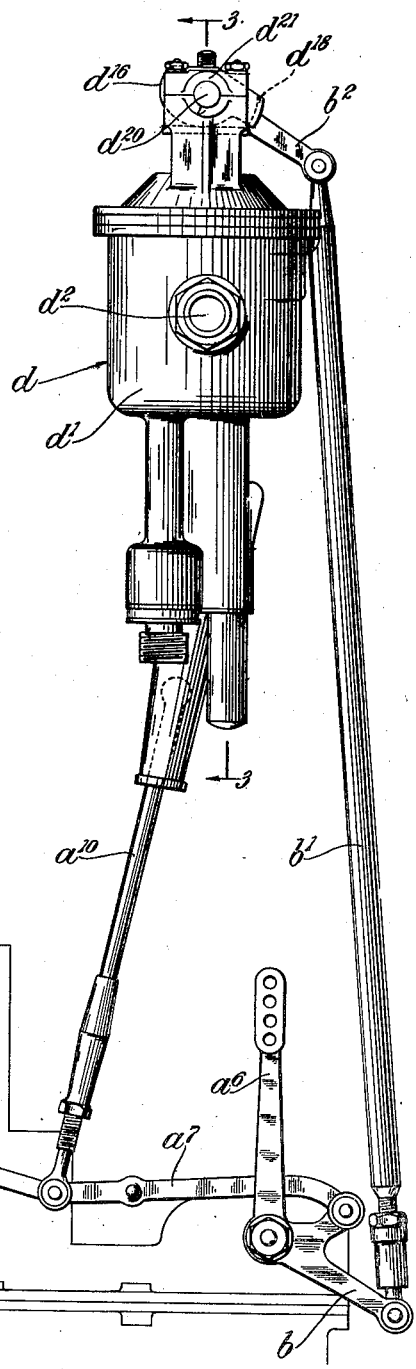
Fig. 2 illustrates the boost control device showing the means for changing the datum drawn to an enlarged scale.
Figure 3:
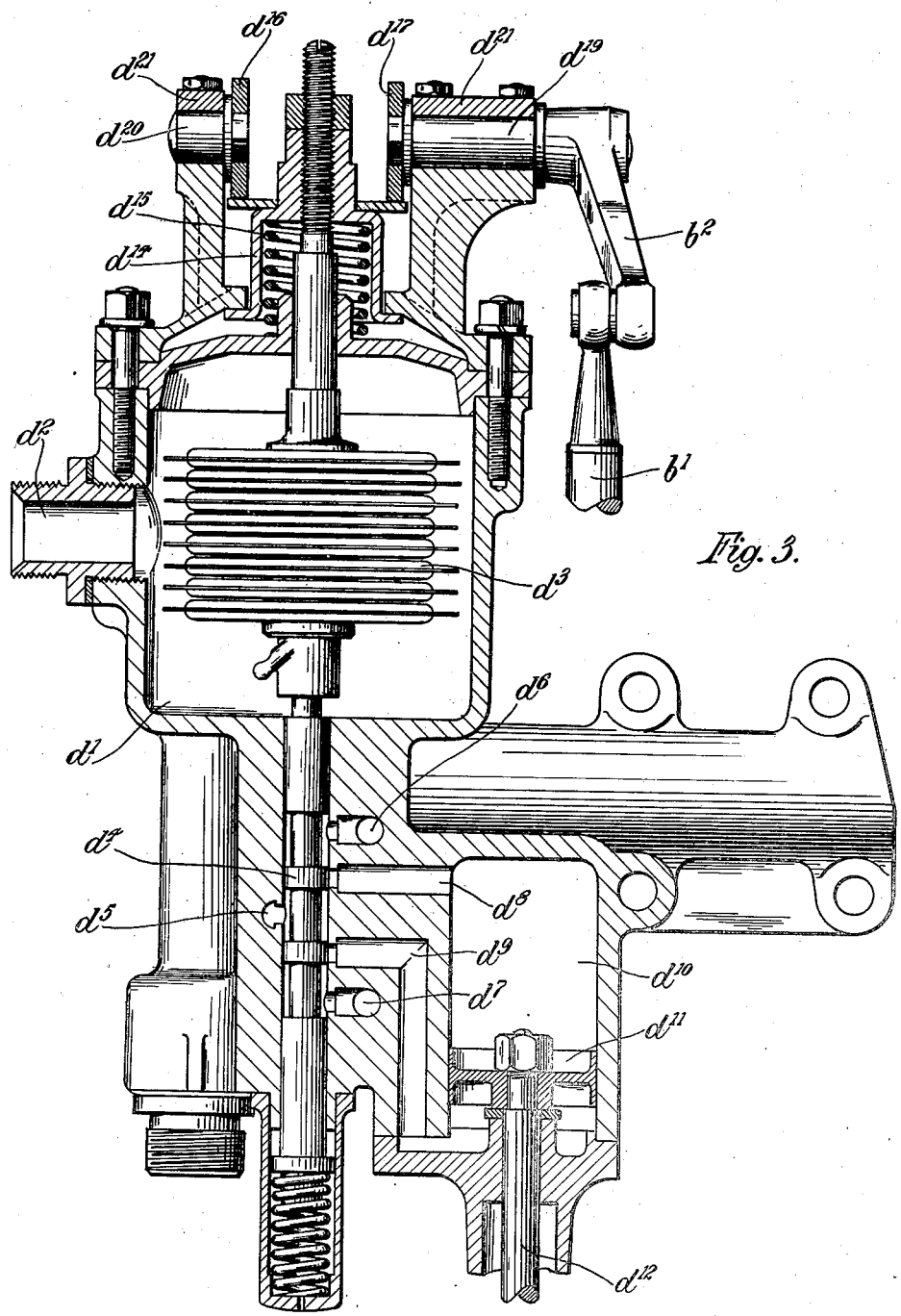
Fig. 3 is a section on the line 3—3 in Fig. 2, drawn to an enlarged scale.

The boost control device indicated generally at $d$ in Figs. 1 and 2, is shown in detail in Fig. 3, and comprises a casing $d^1$ communicating by means of the pipe $d^2$ with the induction system of the engine. This casing contains an aneroid device consisting of the capsules $d^3$ connected at their lower end to a piston valve $d^4$ which controls the inlet passage $d^5$ and the exhaust passages $d^6$, $d^7$ for the oil under pressure supplied through the passages $d^8$, $d^9$ to and from the servo-motor cylinder $d^{10}$ where it acts on the piston $d^{11}$. The piston rod $d^{12}$ of said piston $d^{11}$ is connected to the link $a^{10}$ (Fig. 1) so that with variation in pressure in the induction system the capsules expand or contract and thereby actuate the piston valve $d^4$ to control the operation of the servo-motor in the well known manner. On the upper end of the aneroid device a cap $d^{14}$ is fixed which is pressed upwardly by the spring $d^{15}$ but which is adapted to be pressed downwards against the spring by two cams $d^{16}$ and $d^{17}$. These cams are interconnected by the web $d^{18}$ (Fig. 2) and are fixed on the shafts $d^{19}$, $d^{20}$ mounted in the bearings $d^{21}$. The shaft $d^{19}$ is operable by the arm $b^2$ as previously explained. The cams $d^{16}$, $d^{17}$ and the shafts $d^{19}$, $d^{20}$ constitute the means for changing the datum of the boost control and are so arranged that the cap $d^{14}$ is depressed as the throttle control lever $a^1$ approaches the full throttle position shown in full lines in Fig. 4. On depression of the cap $d^{14}$ the aneroid device is moved downwardly as a whole, thereby altering the datum relative to which variations in pressure in the casing $d^1$ actuate the servo-motion piston $d^{11}$.

The arrangement of the mechanism inside the casing $a$ carrying the pilot's throttle control and mixture control levers is shown in Fig. 4. The mixture control lever $a^2$ is connected at $e$ to an actuating lever $e^1$ arranged between the mixture control lever and the throttle control lever $a^1$. The throttle control lever is provided with a projection $e^2$ adapted to engage with the lever $e^1$. When the throttle control lever $a^1$, in moving to open the throttle valve, moves from the cruising position indicated in dotted lines in Fig. 4 to the full throttle position shown in full lines, the stop $e^2$ causes the actuating lever $e^1$ to move the mixture control lever $a^2$ to the left from the position indicated in dotted lines to the position shown in full lines in Fig. 4 so as thereby to enrich the mixture. Although the means (for example the projection $e^2$ and lever $e^1$) for actuating the mixture control lever are more conveniently arranged in the casing $a$, said means could be placed in any suitable position intermediate said casing and the parts of the engine operable by the control levers.

With means for changing the datum of the boost control as described herein, it becomes feasible on a boost controlled engine for the carburetter power jet usually provided to enable a richer mixture to be obtained at full throttle for maximum power to be operated directly by the pilot's throttle lever and said power jet will then only be in operation at such times as normal boost is being used, which meets the requirements.

What I claim as my invention and desire to secure by Letters Patent is:—

1. A throttle control for supercharged aircraft engines comprising, a pilot's throttle control lever, an induction throttle valve, means connecting said lever to said throttle valve, a boost control connected to said connecting means arranged to vary the position of said throttle valve relatively to that of said throttle control lever according to altitude, means for changing the datum of said boost control, means for operating said datum changing means from the pilot's throttle lever, a mixture control adapted to vary the strength of the mixture supplied to the engine, and means operable by the pilot's throttle lever for moving said mixture control to enrich the mixture as the pilot's throttle lever approaches the full throttle position.

2. A throttle control for supercharged aircraft engines comprising a pilot's throttle control lever, an induction throttle valve, means connecting said lever to said throttle valve, a boost control including an aneroid device controlling a servo-motor connected to said connecting means and arranged to vary the position of said throttle valve relatively to that of said throttle control lever according to altitude, means for moving the aneroid device to change the datum of said boost control, means for operating said datum changing means from the pilot's throttle lever, a mixture control adapted to vary the strength of the mixture supplied to the engine, and means operable by the pilot's throttle lever for moving said mixture control to enrich the mixture as the pilot's throttle lever approaches the full throttle position.

3. A throttle control for supercharged aircraft engines comprising, a pilot's throttle control lever, an induction throttle valve, means connecting said throttle lever to said throttle valve, a boost control connected to said connecting means and arranged to vary the position of said throttle valve relatively to that of said throttle control lever according to altitude, means for changing the datum of said boost control, means for operating said datum changing means from the pilot's throttle lever, a mixture control lever, a mixture control valve, means connecting said mixture control lever to said mixture control valve, and means operable by the pilot's throttle lever for moving said mixture control lever to a rich mixture setting when the pilot's throttle lever changes the datum of the boost control to increase the boost pressure.

4. A throttle control for supercharged aircraft engines comprising, a pilot's throttle control lever, an induction throttle valve, means connecting said lever to said throttle valve, a boost control including an aneroid device controlling a servo-motor connected to said connecting means and arranged to vary the position of said throttle valve relatively to that of said lever according to altitude, means for moving said aneroid device to change the datum of said boost control, means for operating said datum changing means from the pilot's throttle lever, a mixture control lever, a mixture control valve, means connecting said mixture control lever to said mixture control valve, and means operable by the pilot's throttle lever for moving said mixture control lever to a rich mixture setting when the pilot's throttle lever changes the datum of the boost control to increase the boost.

5. A throttle control for supercharged aircraft engines comprising, a pilot's throttle control lever, an induction throttle valve, means connecting said throttle lever to said throttle valve, a boost control including an aneroid device controlling a servo-motor connected to said connecting means adapted to vary the position of said throttle valve relatively to that of said throttle control lever according to changes in altitude, a cap on said aneroid, a spring for moving said cap in one direction and cams for moving said cap in the opposite direction against the action of said spring in order to change the datum of said boost control, means for operating said cams from the pilot's throttle lever so as to increase the induction pressure as the throttle control lever moves towards the full throttle position, a mixture control adapted to vary the strength of the mixture and means operable by said throttle control lever for moving the mixture control to enrich the mixture as the throttle lever approaches the full throttle position.

6. A throttle control for supercharged aircraft engines, comprising a pilot's throttle control lever, an induction throttle valve, means connecting said lever to said throttle valve, a boost control connected to said connecting means arranged to vary the position of said throttle valve relatively to that of said throttle control lever according to changes in altitude, means for changing the datum of said boost control, means for operating said datum changing means from the pilot's throttle control lever, a mixture control lever, a mixture control valve adapted to vary the strength of the mixture supplied to the engine, means connecting said mixture control lever to said mixture control valve, a casing carrying said throttle control lever and said mixture control lever, an actuating lever in said casing connected to said mixture control lever and a projection on said throttle control lever adapted, when said lever approaches the full throttle position, to cause the actuating lever to move the mixture control lever to enrich the mixture.

7. A throttle control for supercharged aircraft engines comprising, a pilot's throttle lever, an induction throttle valve, means connecting said lever to said throttle valve, a boost control including an aneroid device controlling a servo-motor connected to said connecting means and arranged to vary the position of said throttle valve relatively to that of said lever according to altitude, cams for moving said aneroid device to change the datum of said boost control, means for operating said cams from the pilot's throttle lever, a mixture control lever, a mixture control valve adapted to vary the strength of the mixture supplied to the engine, means connecting said mixture control lever to said mixture control valve, an actuating lever connected to said mixture control lever and a projection on said throttle control lever adapted, when the lever approaches its full throttle position, to cause the actuating lever to move the mixture control lever to enrich the mixture.

8. A throttle control for supercharged aircraft engines comprising, a pilot's throttle control lever, an induction throttle valve, means connecting said lever to said throttle valve, a boost control connected to said connecting means arranged to vary the position of said throttle valve relatively to that of said throttle control lever according to altitude, means for changing the datum of said boost control and means for operating said datum changing means from the pilot's throttle lever.

9. A throttle control for supercharged aircraft engines comprising, a pilot's throttle control lever, an induction throttle valve, means connecting said lever to said throttle valve, a boost control connected to said connecting means arranged to vary the position of said throttle valve relatively to that of said throttle control lever according to altitude, means for changing the datum of said boost control and means for operating said datum changing means from the pilot's throttle lever in such a manner that each definite angular position of the pilot's throttle lever coincides with a definite pressure in the induction system up to the rated height of the engine.

EDWARD DODSON.